United States Patent [19]
Durif

[11] Patent Number: 5,232,033
[45] Date of Patent: Aug. 3, 1993

[54] FLAT-BASE RIM FOR HEAVY TRUCK TUBELESS TIRE AND ASSEMBLY OF SUCH A RIM WITH A TIRE

[75] Inventor: Pierre Durif, Enval, France

[73] Assignee: Compagnie Generale des Etablissements Michelin - Michelin & Cie, Clermont-Ferrand, France

[21] Appl. No.: 891,179

[22] Filed: May 29, 1992

[30] Foreign Application Priority Data

Jun. 10, 1991 [FR] France .................. 91 07114

[51] Int. Cl.⁵ .............................................. B60B 25/00
[52] U.S. Cl. ............................ 152/381.4; 152/379.3; 152/394
[58] Field of Search .................... 301/95-98; 152/375, 379.3, 379.4, 379.5, 381.4, 384, 391, 393, 394

[56] References Cited

U.S. PATENT DOCUMENTS

| | | | |
|---|---|---|---|
| 4,373,567 | 2/1983 | Declercq | 152/405 |
| 4,422,490 | 12/1983 | Power | 301/63 DS X |
| 4,658,876 | 4/1987 | Augier | 152/394 |
| 4,700,765 | 10/1987 | Masclaux | 152/545 |

FOREIGN PATENT DOCUMENTS

| | | |
|---|---|---|
| 0221195 | 5/1987 | European Pat. Off. . |
| 2452306 | 6/1976 | Fed. Rep. of Germany . |
| 2456419 | 8/1976 | Fed. Rep. of Germany ... 152/381.3 |
| 2414883 | 10/1976 | Fed. Rep. of Germany ... 152/379.3 |
| 2514883 | 10/1976 | Fed. Rep. of Germany . |

Primary Examiner—Russell D. Stormer
Attorney, Agent, or Firm—Brumbaugh, Graves, Donohue & Raymond

[57] ABSTRACT

The rim in accordance with the invention is a rim formed of a metal rim base (1) and two movable side rings (2), each of said rings (2) consisting of vulcanized rubber reinforced by a circumferentially stretchable annular element (41) the cross-section of which is only slightly deformable under compressive stress. A tire of an H/B form ratio of 0.80 which is particularly adapted to such a rim has beads each comprising two annular elements (64', 64"; 74', 74"; 84', 84"; 94', 94") which are unstretchable and have faces which make it possible to insert between them either the end (72, 92) of the carcass reinforcement (70, 90) or the carcass reinforcement (60, 80) and/or itself or its turn-up (61, 81).

21 Claims, 5 Drawing Sheets

FLAT-BASE RIM FOR HEAVY TRUCK TUBELESS TIRE AND ASSEMBLY OF SUCH A RIM WITH A TIRE

BACKGROUND OF THE INVENTION

The present invention relates to a rim for the mounting and travel of a tubeless tire, that is to say a tire without inner tube, intended to equip vehicles of "heavy truck" types, such as trucks, buses, and "subway trains". It also relates to a rolling assembly formed of such a rim and a tubeless tire having beads of a special structure.

If we consider the rims of the rolling assemblies presently used, we can distinguish primarily so-called hollow base rims which have frustoconical seats inclined by an angle of 5° or 15° to the axis of rotation of the assembly, and rims with a flat or practically flat base having seats inclined either 0° or 5° with respect to the axis of rotation.

The so-called hollow-base rims have a mounting groove the diameter of which is definitely less than the nominal diameter of the rim. This inside diameter of the rim is considered by the users to be too small and does not make it possible to select brake drums of dimensions suitable for effective braking of the vehicles, which are becoming more and more powerful.

It is extremely desirable to increase the diameter of the rim base, and to do so to the greatest extent possible, without increasing the overall diameter of the rolling assembly, which comes down to using a rim with a flat base, the diameter of the base being substantially equal to the nominal diameter of the rim.

For the mounting of tubeless tires, a flat-base rim requires the presence of at least one removable side ring, a locking ring, and a sealing joint and further requires that the rim base be provided with a fixed flange on the side opposite the side where the parts are removable. At least three parts are therefore necessary. In most cases, the number of parts necessary is greater than three and may at times reach six in the case of the "heavy truck" rims of large dimensions; except for the sealing joints, the parts of a rim are made of metal and are therefore bulky and heavy. Furthermore, these metal parts are frequently subject to partial, localized wear with or without oxidation and formation of rust which damage, upon subsequent use, leads to defective mountings with loss of pressure and also the creation of a concentration of stresses which may result in the breaking of parts and accidents. Furthermore, vulcanized rubber sealing joints, as is known, require a great deal of care with regard to their placing; furthermore, they are subject to natural oxidation and hence to cracks. Thus, in many cases the conditions are such that these joints do not satisfactorily play the role for which they were intended.

SUMMARY OF THE INVENTION

In order to overcome these drawbacks, the invention proposes a rim formed of a metal rim base and two removable side rings each formed of a seat and a flange, characterized by the fact that each side ring, seen in meridian section, has a radially outer face formed of a frustoconical generatrix of axial width L, of radius $R_S$ with respect to the axis of rotation of the rim, forming an angle $\beta$ of between 0° and 15° and with said axis connected to a flange of height H via a circular arc of radius $\sigma_1$ and a radially inner face formed of a cylindrical part of radius $R_e$, of axial width $L_1$ of between $L+(H+h)/2$ and $L+(H+h)$ and, axially to the outside, a frustoconical part the generatrix of which forms, with the angle of rotation, an axis $\alpha$ of between 10° and 35°, h being the thickness of the frustoconical seat of the side ring equal to $R_S - R_e$, each side ring being formed of a vulcanized rubber mix reinforced, between the flange and the inner face, by an annular reinforcement element, the circumferential development of which may be lengthened by at least 3%, having a cross-section the maximum radial dimension D of which is between the amounts of (H+h) and H, the deformation of this section under compressive stress being less than 2%, and by the fact that the metal rim base has a cylindrical part of radius $R_F$ equal to $kR_e$, k being between 1.02 and 1.05, this cylindrical part being extended axially to the outside by frustoconical parts the generatrices of which form, with the axis of rotation, angles $\alpha_1$ within the range of $\alpha \pm 2°$, the maximum radii $R_J$ of these frustoconical parts being such that the quantity $[R_F+(H+h)]-R_J$ is less than the dimension D.

By maximum radial dimension D of the cross-section of the annular reinforcement element, there is to be understood the greatest radial distance between two points of the contour of said section located on a perpendicular to the axis of rotation of the rim.

Ordinarily the cross-section of the reinforcement element is circular. This section preferably has at least faces parallel, on the one hand, to the contour of the flange of the radially outer face of said side ring and, on the other hand, to its radially inner face.

By deformation of the section under compressive stress, there is to be understood the deformation under compression of the maximum radial dimension D.

The flange of the radially outer face of the side ring may be of various shapes. Whatever the shape, it intersects the generatrix of the frustoconical seat at a given point. Through this point there pass, on the one hand, a straight line perpendicular to the axis of rotation and, on the other hand, a straight line parallel to said axis. These two lines are the reference axes for the measurement of the axial distances and radial distances. The traces corresponding to the flange shapes are, seen in meridian section, advantageously located radially to the outside and axially to the inside of a line segment connecting the above-defined point of intersection with a point of the flange top located at the distance (H+h)/2 from the horizontal reference axis. The ring flange may also be formed of a circular arc of radius $\rho_2$, tangent to the first circular arc of radius $\rho_1$, $\rho_2$ being equal to H. It may also be formed of a line segment perpendicular or not to the axis of rotation, tangent to the circular arc of radius $\rho_1$ and to a second circular arc of radius $\rho_3$ so as to obtain the desired height H.

The radially outer face of the side ring may have a meridian profile identical to the standard profile (international TRA or ETRTO standards) of the rim flanges.

The radially inner face of the removable side elastic ring is advantageously provided with a protrusion which has a triangular shape in meridian section, the thickness of said protrusion being between 4 and 6 mm. The purpose of this protrusion, in combination with the corresponding notch or groove of the radially outer face of the rim base, is the proper positioning of the side ring. This protrusion can also be located axially at any point of the radially inner face of the side ring. In particular, the axially outer side of the triangular shape may be along the extension of the frusto-conical part of the inner face of the side ring, which permits an increase in the dimension D of the annular reinforcement of the side ring. As to the other side of the triangular shape, it establishes the connection with the inner face of the frustoconical seat.

As to the rim base, in addition to the groove for the positioning of the side ring, it advantageously has a central reinforcement of a thickness substantially equal to $R_J - R_F$, which improves the guidance of the bead wires of the tire upon the mounting and inflation and permits the passage of the inflation valve.

The annular reinforcement element is advantageously an annular coil spring with adjoining metal turns. An individual turn may be of any cross-section but it is preferably circular, and the diameter of the cross-section of the turn is, as a function of the dimensions of the spring, between 1 and 4 mm, which permits deformation of the turn under compression of less than 2%. By deformation under compression of the turn, there is to be understood the deformation of a diameter D of the cross-section of the spring; the reduction in the diameter must not be greater than or equal to 2%.

The resistance to compression of this spring may advantageously be improved by inserting within the turns either a ring of vulcanized rubber of great hardness or a ring of plastic material, these rings being circularly discontinuous in order to preserve the elasticity of the spring.

By vulcanized rubber mix or composition there is understood a mix of elastomer, reinforcing fillers and various well-known additives, which is vulcanized. The secant modulus of elasticity with a relative elongation of 10% is at least equal to 5.5 MPa.

In order to improve the resistance to compression of the side ring in a direction parallel to the axis of rotation of the rim and, more particularly, of the seat of said ring, it is advantageous to reinforce the side ring by a reinforcement layer of radial cables, which ply is turned up around the annular reinforcement element so as to form two reinforcement layers in the seat of the side ring.

Moreover, the rim defined above has great advantages, in particular upon use with certain tires. In fact, while it is desirable to increase the diameter of the rim without increasing the overall diameter of the rolling assembly, it is advantageous in other cases to decrease the overall diameter of the tire without decreasing the diameter of the rim, this rolling assembly concept being recommended in order to lower the center of gravity of "heavy truck" vehicles and, in particular, trailers or semi-trailers.

In all cases, therefore, "heavy truck" tires are desired the form ratio of which, that is to say the ratio of the height on the rim to the maximum axial width, is less than 0.80, this ratio being obtained while substantially retaining the present standard maximum axial width.

The production of such tires is difficult. For rated conditions of load and pressure known for a given size of the tire, decreasing the height of this tire inevitably results upon travel in clear inadequacies as to the life of the tire beads, namely in particular, inadequacies at the level of the ends of the turn-ups of the carcass reinforcement which are free of any movement.

Simple methods for remedying these defects or damage occurring at the turn-up ends of the carcass reinforcement are known. A first method consists in eliminating the turn-ups, the carcass reinforcement ends being then inserted between two metal parts which may be metal strips, metal bead wires or any other annular metal parts which have flat portions of sufficient axial width which are substantially concentric to each other in their radially outer and radially inner faces respectively. A variant of this method consists in eliminating one of the metal parts and clamping the ends of the carcass reinforcement between one metal part and the metal seat of the service rim.

A second method consists of retaining the carcass reinforcement turn-ups around bead wires but clamping these turn-ups between said wires and auxiliary wires located radially above the said main bead wires.

Such arrangements are, for instance, described in French Patents 1 456 962 and 1 328 752.

The tires thus described require for their mounting hollow-base rims with, upon mounting, a necessary ovalizing of the beads, which leads to considerable forces being exerted on said beads and even, in certain cases, to the impossibility of mounting.

In order to produce "heavy truck" tires the H/B ratio of which is less than 0.80 and which do not require mounting on a hollow-base rim, the invention also proposes a rolling assembly formed of a rim such as described previously and a tire the carcass reinforcement ends of which or the carcass reinforcement of which and/or its turn-up are clamped in the beads between two faces, respectively, of two circumferentially unstretchable annular elements which are integral parts of the tire, said faces being flat and parallel to each other over an axial distance at least equal to 15 mm and inclined with respect to the axis of rotation by an angle open towards the outside of the tire of between 5° and 30°, one of the elements radially covering the rim flange and apart of its seat, the ends of the annular elements closest radially to the axis of rotation of the assembly being at a distance $R_p$ at least equal to the radius $R_J$ of the rim 1.

By parallel faces, there are to be understood faces the traces of which, in a meridian plane, form an angle of 0°±5°.

The annular elements may be metallic or of a reinforced composite material. When they are metallic, these elements may be bead wires, formed either of strip or ribbon, of bent or unbent shape or wires of rectangular section, preferably of steel. Such bead wires may be of only simple shape. Advantageously, since more economical and permitting any possible shape, the metal elements are ferrules. In both cases, with bead wires or ferrules, one of the metal elements rests at least one the seat of the elastic side ring and the second element covers the first nd, in all cases, the top of the flange of the elastic side ring. The metal element which covers the seat of the side ring preferably also covers the top of the flange.

In the case of a carcass reinforcement with a turn-up, the turn-up can be effected around the metal element resting against the seat of the elastic ring, whether from the inside towards the outside or vice versa, the end of the turn-up being then clamped between the two metal elements without the carcass reinforcement itself being so clamped. The turn-up of the carcass reinforcement can advantageously be effected around a secondary bead wire, reinforcing a vulcanized rubber mix point located between or axially to the inside of the two metal elements.

This secondary bead wire, of small diameter, but nevertheless greater than the distance axially separating on the inside of the two flat faces facing the metal elements and of lower resistance, permits in combination with the clamping action of the two flat faces of the metal elements, a better taking up of the tensile stresses of the carcass reinforcement.

In the event of the preferred solution consisting of metal ferrules, the radially inner face of the lower ferrule has a meridian profile identical to that of the radially outer face of the corresponding elastic side ring, thus permitting the resting of the ferrule, on the one hand, on the seat of the side ring, on the other hand, on the flange of said ring.

As to the radially outer face of said lower ferrule, it has either a linear generatrix inclined at an angle of between 5° and 30° or a generatrix formed of two straight lines, one of which is inclined by an angle of between 5° and 30° while the other, axially on the outside, has a lesser inclination.

The radially inner face of the upper ferrule has either a linear generatrix inclined by the same angle as the more inclined generatrix of the radially outer face of the lower ferrule or two line segments, one inclined as previously and the other having a greater inclination.

In order to permit a better anchoring of the carcass reinforcement, the facing flat faces of the two metal ferrules are advantageously provided with circumferential striations, these striations being of identical shape and dimensions as the known striations employed on rims intended for off-road tires of large dimensions, that is to say, in the form of saw teeth of a depth of between 0.4 mm and 0.8 mm.

Similarly, these faces can be provided with cylindrical orifices of a diameter of between 2 mm and 6 mm. For the same purpose, the radial carcass reinforcement of the tire, which may be formed of one or more plies, will advantageously be reinforced, in the part thereof clamped between the two faces of the ferrules, by one or more reinforcement plies of cables, for instance of polyamide textile and preferably aromatic polyamide, said ply or plies possibly surrounding the secondary blocking bead wire. The angles formed by the cables of said reinforcement ply or plies with the circumferential direction are preferably between 60° and 90°.

DESCRIPTION OF THE DRAWINGS

The invention will be better described and better understood by means of the description of non-limitative embodiments illustrated in the accompanying drawings, in which.

3A) with two bead wires, with carcass reinforcement turn-up clamped between them, 3B) with two bead wires, with carcass reinforcement end clamped between them, 3C) with two metal ferrules, with carcass reinforcement and its turn-up clamped between them, 3D) with two metal ferrules, with reinforced carcass reinforcement inserted between the two ferrules.

DESCRIPTION OF PREFERRED EMBODIMENTS

Figure 1A:
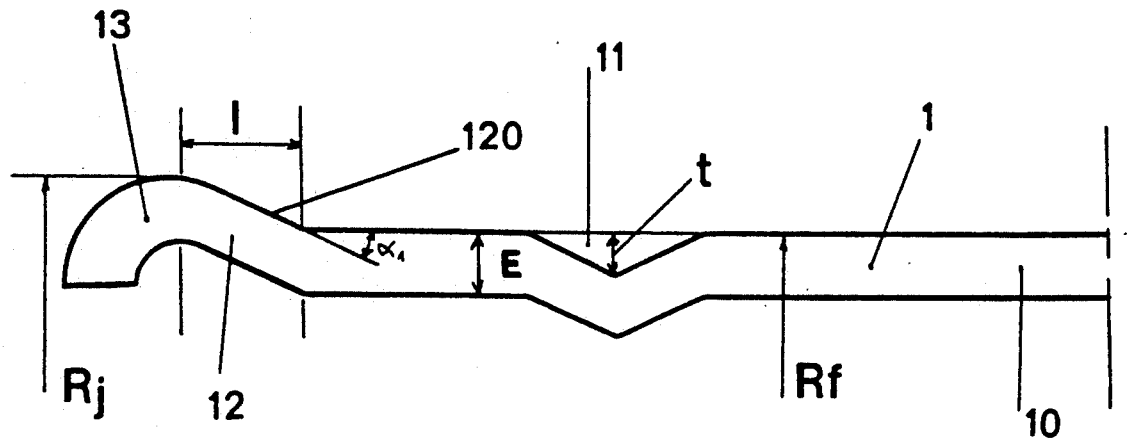
FIGS. 1A and 1B show diagrammatically in meridian section two variant rim bases in accordance with the invention.
Figure 1B:
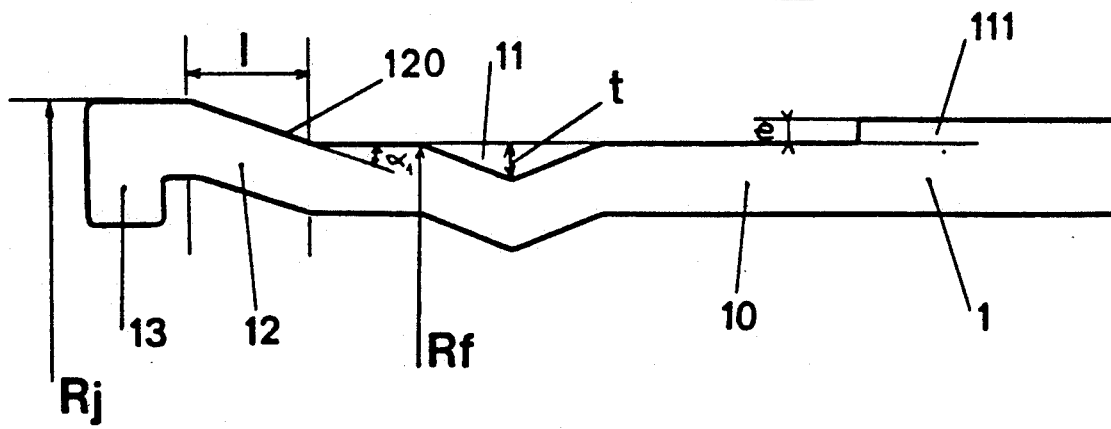
Figure 2B:
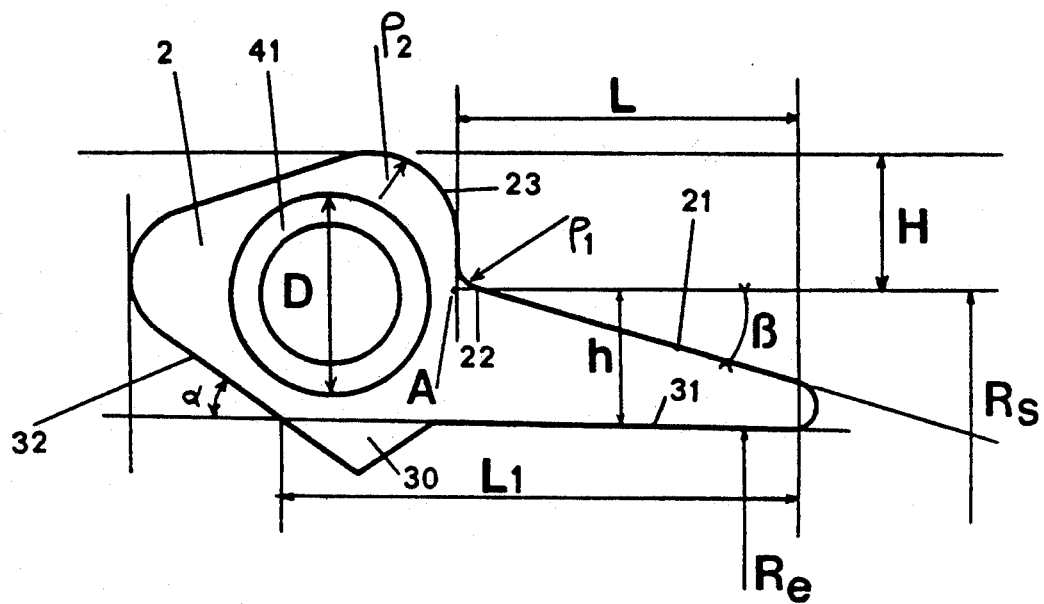
FIGS. 2A and 2B diagrammatically show meridian section, two variant removable elastic side rings.
Figure 2A:
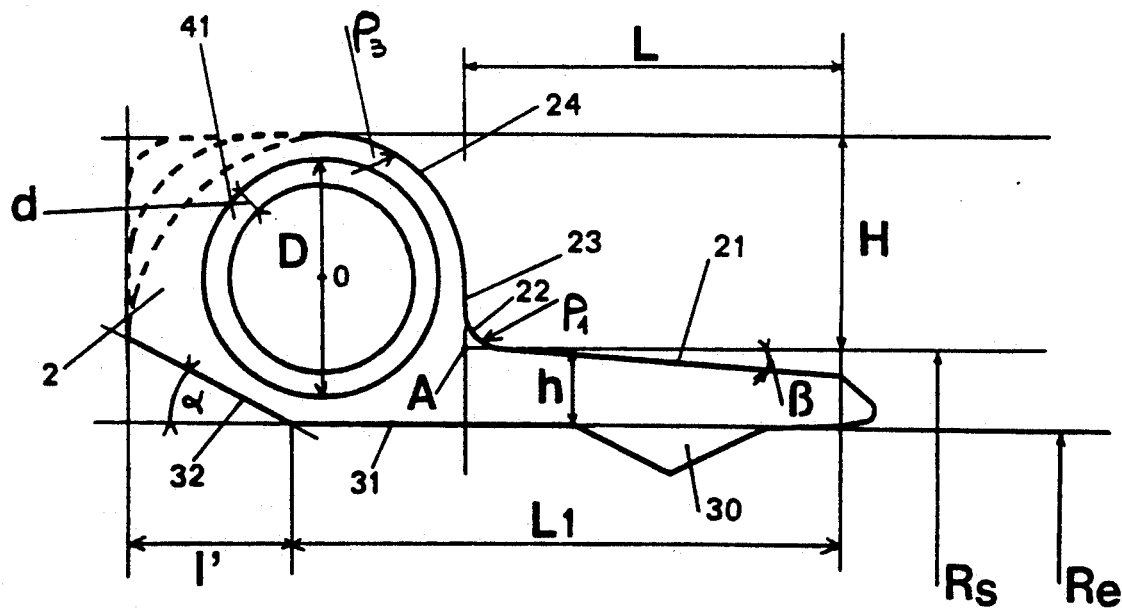

The rim bases of FIGS. 1A and 1B and the removable side rings of FIGS. 2A and 2B are 20×7.5 rim elements which can replace the so-called 7.50V, 7.5, 7.5V or 7 1/2 L rims, for instance.

The cylindrical part 10 of the rim bases 1 of FIGS. 1A and 1B has a radius $R_F$ equal to 254 mm. It has a recess 11 of triangular meridian section the height t of which is equal to 5 mm, while the thickness E of the base 10 is 10 mm. The base, shown in FIG. 1B, is provided with a central reinforcement 111 of a thickness e equal to 5 mm.

Axially to the outside, the cylindrical part 10 is extended by a frustoconical seat 12, the generatrix 120 of this frustoconical seat forming an angle $\alpha_1$ of 20° with the axis of rotation of the rim. The axial width 1 of this seat is in the present case 20 mm, the maximum radius $R_J$ of the rim base 1 being then 261.3 mm.

The frustoconical seat 12 is extended axially to the outside by a rim hook 13 which is either circular (FIG. 1A) or rectangular (FIG. 1B).

The removable ring 2 of FIG. 2A is a side ring with a 5° frustoconical seat. The radially outer face is formed of the seat 21 of axial width L equal to 30 mm, forming an angle $\beta$ of 5° with the axis of rotation of the rim. This seat 21 is extended axially to the outside by a circular arc 22 of radius $\rho_1$ equal to 8 mm, this circular arc 22 being tangent to a straight line segment 23 which is perpendicular to the axis of rotation, the straight line segment being extended by a second circular arc 24 of radius $\rho_3$ equal to 20.3 mm. The height H of the flange, measured from the point of intersection A between the straight line segment 23 and the seat 21 is equal to 44.45 mm.

The radius $R_S$ at the point A is 264 mm. The radially inner face is formed of a cylindrical part 31, the radius $R_e$ of which is 248 mm and which is located at a radial distance h from the point A equal to 16 mm. The axial width $L_1$ of this cylindrical part 31 is 66.4 mm. On this cylindrical part 31 there is the protrusion 30 of thickness t of 5 mm intended to fill the recess 11 of the rim base 10. Axially to the inside and forming an extension of the cylindrical part 31, there is the frustoconical part 32 intended to bear against the corresponding part 12 of the rim base 10. In the case under study, the axial width 1' of this part 32 is equal to the width 1 of the seat 12, and the angle $\alpha$ which this part 32 makes with the axis of rotation of the rim is the same as the angle $\alpha_1$ between the generatrix 120 of the seat 12 of the rim base 10 and said axis of rotation, equal to 20°.

The removable side ring 2 is reinforced by an endless coil spring 41 having adjoining turns of brass-coated steel and a diameter d equal to 2 mm. Seen in meridian section, the center O of the turn is substantially at the same distance (H+h)/2, that is to say, 30.22 mm, from the cylindrical face 31 of the vertical wall 23 and the top of the flange 24 of the side ring 2. The diameter D of the cross-section of the spring is equal to 58 mm. In order, on the one hand, to avoid separation between the, turns of the spring 41 and the vulcanized mix of the ring 2 and, on the other hand, to increase the resistance to deformation by transverse compression of the spring, the latter is advantageously filled on the inside with vulcanized rubber mix 20 of the same composition as the side ring 2 rubber mix.

The junction between the radially outer face and the radially inner face, whether radially to the inside or axially to the outside, as shown in FIG. 2A by the dashed lines, has no technical effect.

FIG. 2B shows a variant side ring 2 in which the radially outer face is formed of a seat 21 of axial width L equal to 34 mm but forming an angle $\beta$ equal to 15° with the angle of rotation. This seat 21 is extended by a circular arc 22 of radius $\rho_1$ equal to 8 mm, itself extended by a second circular arc 23 tangent to the first and of a radius $\rho_2$ equal to 12.7 mm.

At the level of the point A, the radius $R_S$ is 285.8 mm and the radial distance h between the point A and the inner cylindrical face 31 is 30 mm. The coil spring 41 is adapted, of course, to the height H, equal to 12.7 mm, to the height h of 30 mm, and to the depth of 5 mm of the protrusion 30 of said side ring 2. The diameter D of the spring is then 38 mm, while the ring 2 is mounted on a rim base having a radius $R_1$ equal to 275 mm, a radius $R_F$ equal to 267.7 mm, with a frustoconical part such as described previously for the rim bases of FIGS. 1A and 1B.

Figure 3A:
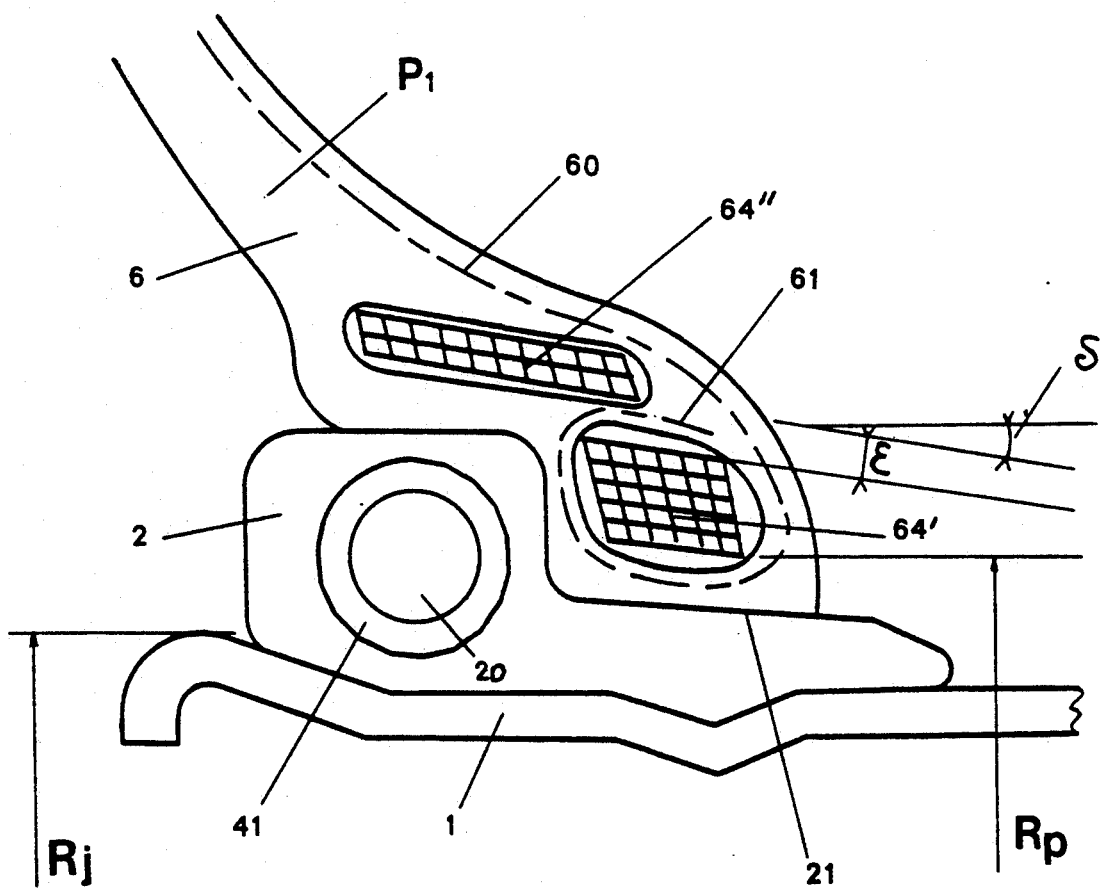
FIGS. 3A to 3D show a rolling assembly formed of a rim in accordance with the invention and a tire having beads.

FIG. 3A shows partially the assembly of a rim, formed of the rim base 1 and of two side rings 2 provided with springs 41 and a tire $P_1$, each of the beads 6 of which is provided with two bead wires 64' and 64", clamping between them the turn-up 61 of the carcass reinforcement 60 after winding around the radially inner bead wire 64'.

The first of these bead wires 64' is formed either of rectangular steel wires or of a wound steel strip or ribbon and the live bead and the bead wires 64' therein rest on and are supported by the seat 21 of the side ring 2. The second of these bead wires 64" is given support by, on the one hand, the first bead wire 64' and, on the other hand, the top of the flange of the side ring 2. The shapes and dimensions of these bead wires 64', 64" are adapted to the contours against which they rest, and, in the case shown in FIG. 3A, the dimensions of the bead wire 64' are such that its resistance is much greater than the theoretical tension due to the inflation pressure. In the case studied, this bead wire 64, is formed of $8 \times 8 = 64$ steel wires of rectangular section, the base of which measures 2 mm and the height 1.3 mm, while the bead wire 64" is formed of $18 \times 2$, namely steel wires, of rectangular section identical to the section of the wires of the bead wire 64'. The faces of these bead wires, facing each other, are parallel to each other over an axial width of 8 mm, inclined with respect to the axis of rotation by an angle $\delta$ equal to 10° and spaced from each other by a radial distance e substantially equal to 3 mm.

Figure 3B:
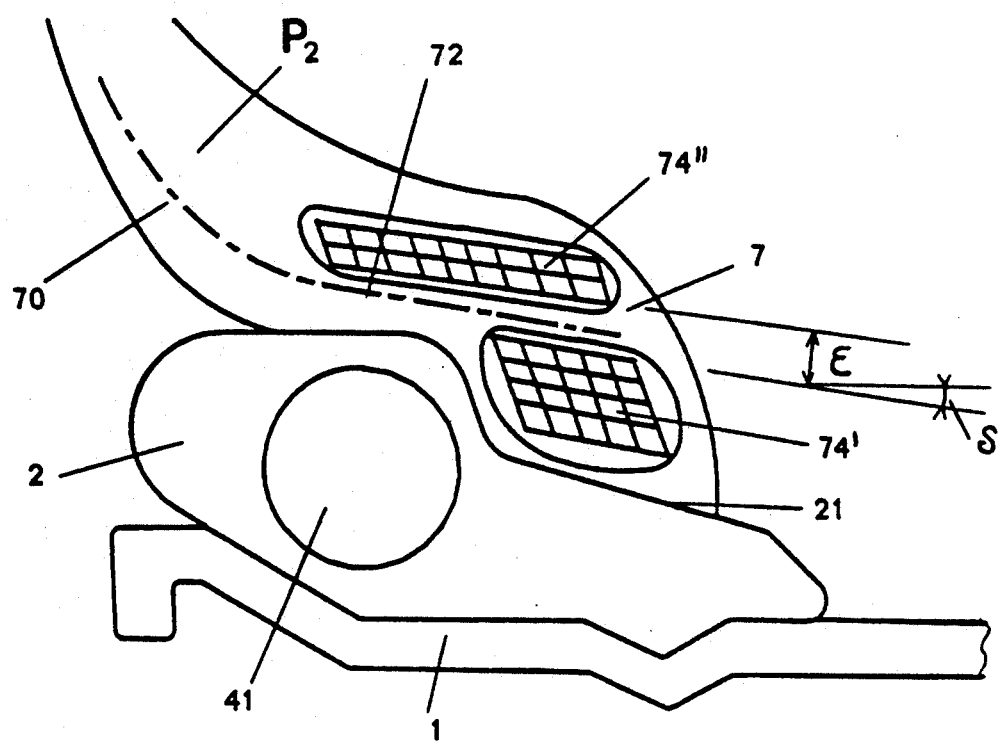

The assembly shown in FIG. 3B employs a rim formed of a side ring 2 and a rim base 1. On this rim, there is mounted a tire $P_2$ the beads 7 of which are each provided with two bead wires 74' and 74" of steel wires of rectangular section of $2 \times 1.3$ mm.

The carcass reinforcement 70 has its ends 72 clamped between the opposing faces of the two bead wires, respectively, which faces are parallel to each other over an axial width of 16 mm and inclined with respect to the axis of rotation of the assembly by the angle $\delta$ equal to 15°, the distance $\epsilon$ remaining equal to 3 mm.

Figure 3C:
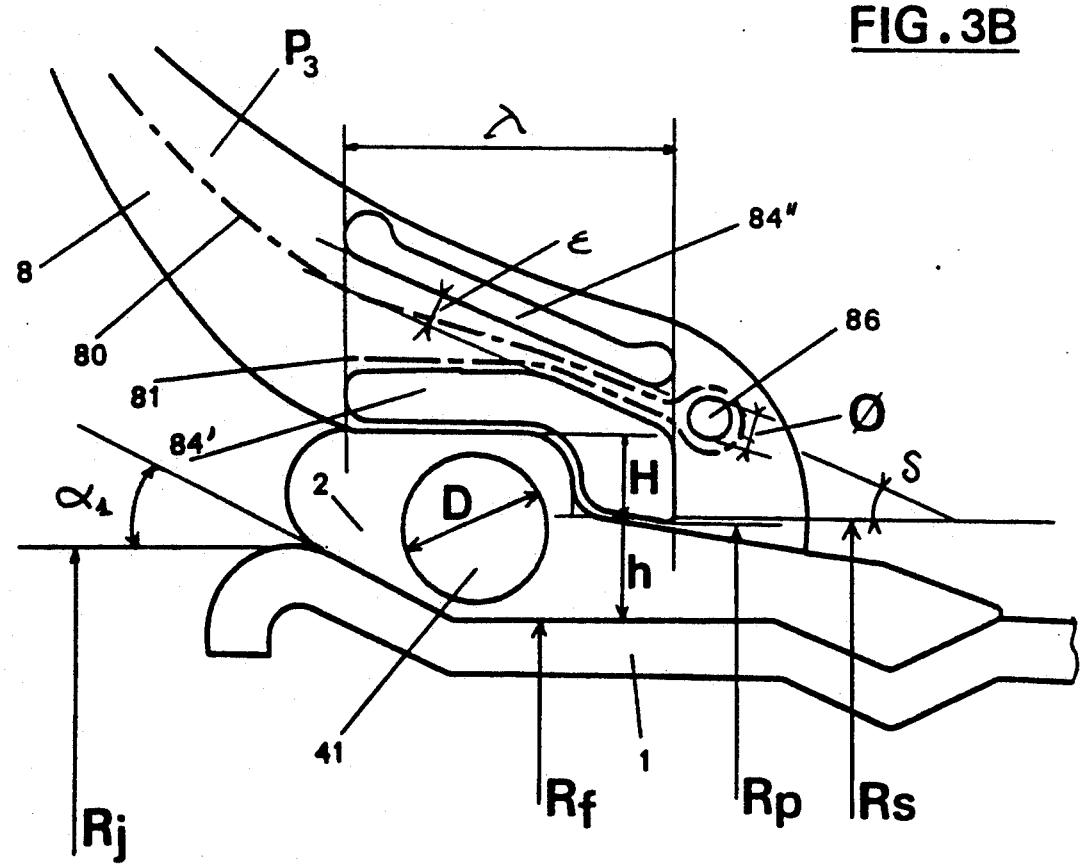

In the variant shown in FIG. 3C, the tire $P_3$ is intended to be used in the place and stead of a 1400R20×tire, that is to say, a tire having the same overall diameter and the same maximum axial width.

The tire $P_3$ in accordance with the invention is mounted on a rim formed of a rim base 1, the radius $R_1$ of which is equal to 313 mm and the radius $R_F$ equal to 305 mm, which value is to be compared with the value of 254 mm corresponding to the nominal radius of the rim on which the customary 1400 R 20×tire is mounted, and two side rings 2 similar to the rings shown in FIG. 2A, the radius $R_e$ of which is equal to 297 mm and the radius $R_S$ equal to 316.6 mm, while the diameter D of the annular reinforcement element 41 is equal to 29 mm. The values H and h are equal to 14 mm and 19.6 mm, respectively, and the angles $\alpha_1$ and $\alpha$ are equal to each other, namely 20°, while the axial width L of the seat of the side ring 2 is 30 mm.

The tire $P_3$ has beads 8 each reinforced by two brass-plated metal ferrules 84' and 84". The lower ferrule 84' has a total axial width $\lambda$ of 54 mm and its radially outer face is formed of a part inclined at an angle $\delta$ of 18° over an axial width equal to 28 mm and of a part parallel to the axis of rotation of the assembly. The upper ferrule 84" which extends over the same total axial width of 54 mm has a linear radially inner face inclined to the axis of rotation by the same angle $\delta$ of 18° and located at the distance e from the inclined face facing the lower ferrule 84, over the axial width of 28 mm. In this case, the distance $\epsilon$ corresponds to twice the thickness of the carcass reinforcement 80 since the latter and its turn-up 81 are clamped between the two opposite faces of the two metal ferrules 84' and 84" over the axial width of 28 mm in which these two faces are parallel to each other. The carcass reinforcement 80 can be simply folded on itself to form the turn-up 81 The carcass reinforcement is preferably turned up around an auxiliary bead wire 86. located axially to the inside of the inner ends of the ferrules 84' and 84", the diameter $\phi$ of which auxiliary bead wire of circular cross-section is slightly greater than the distance $\epsilon$. In the case studied, the carcass reinforcement comprises a single ply of metal cables of a thickness of 1.2 mm; the distance $\epsilon$ is equal to 2.4 mm, and the diameter $\phi$ of the auxiliary bead wire is 3 mm.

Figure 3D:
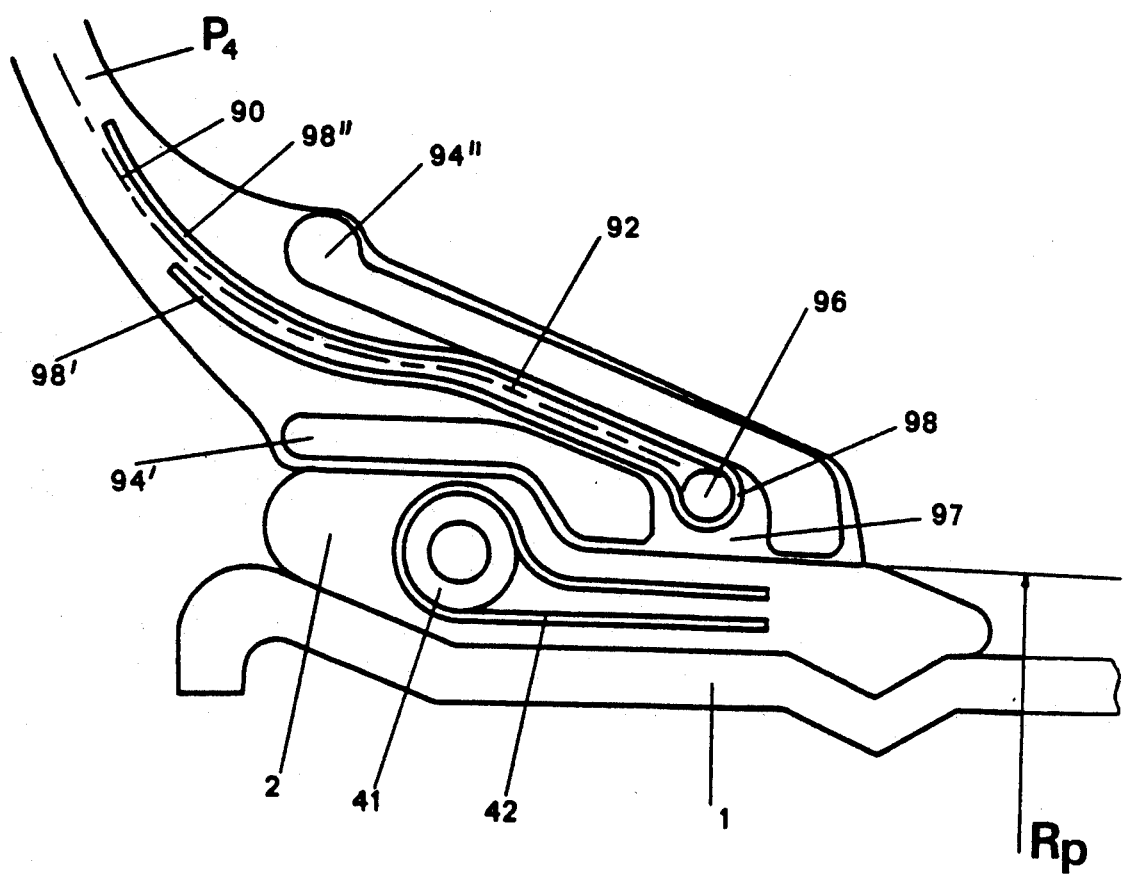

FIG. 3D shows a variant of FIG. 3C. The differences relate to the side ring 2, to the shape of the upper ferrule, and to the anchoring of the carcass reinforcement. The side ring 2 of FIG. 3D is reinforced not only by an annular element 41 but also by a reinforcement ply 42 of compression-resistant radial cables, said cables being of steel or aromatic polyamide. This ply 42 is wound around the annular element 41 to form two layers in the seat of the side ring 2. While the lower ferrule 94' is identical to the ferrule 84' of FIG. 3C, the upper ferrule 94" is axially extended towards the inside while curving so that the downwardly depending and extends toward the side ring 2, and creates a cavity into which the auxiliary bead wire 96, on the one hand, and a rubber point 97, on the other hand, are inserted.

As to the end 92 of the carcass reinforcement 90, it is reinforced by the two layers 98' and 98" formed by the winding of a reinforcement ply 98 of single cords of aromatic polyamide of a diameter equal to 0.7 mm around the auxiliary bead wire 96, which is identical to the bead wire 86 of FIG. 3C. These cables may be inclined with respect to the circumferential direction by an angle of between 60° and 90°, but they are preferably inclined by an angle equal to 90°.

In the case of FIGS. 3C and 3D, that is to say, in the presence of the metal ferrules, the latter may be provided with striations (not shown) on the two parallel inclined faces facing each other. These striations are in the form of saw teeth of a depth equal to 0.8 mm, the edges of such striations being oriented circumferentially.

These striations permit better anchoring of the carcass reinforcement ends. There are likewise perforations or orifices with which the upper ferrule can advantageously be provided, this permitting excellent anchoring by filling the orifices with rubber.

The embodiments described are in no way limitative and, without going beyond the scope of the present invention, various changes may be made in particular by the substitution of equivalent means.

I claim:

1. A tire rim comprising a rim base and two side rings removably mounted on the rim base at axially opposite ends thereof
    each side ring including a tire seat and a flange, the seat, viewed in meridian section, having a radially outer face formed of a frustoconical generatrix forming with the axis of rotation of the rim an angle of between 0° and 15° which outer face is connected with the outer face of the flange by a circular arc,
    each side ring having a radially inner face which includes an axially inner cylindrical portion of axial width between $L+(H+h)/2$ and $L+(H+h)$ and an axially outer frustoconical portion the generatrix of which forms an angle of between 10° and 35° with the axis of rotation, L being the axial width of the frustoconical seat, H being the height of the flange from the radius $R_S$ measured from the axis of rotation of the rim to the largest circumference of the frustoconical seat and h being the thickness of the seat equal to Rs-Re, Re being the radius of the cylindrical portion of the inner face of the side ring,
    each side ring being formed of a material between the radially outer face of the flange and the radially inner face of the ring which material is reinforced by an annular reinforcement element, the circumferential length of which is extendable by at least 3% and having a cross section the maximum radial dimension of which is between (H+h) and H, the deformation of the section under compression stress being less than 2% and
    said rim base having a cylindrical part of radius equal to kRe, k being between 1.02 and 1.05, this cylindrical part extending axially to the outside by frustoconical parts, the generatrices of which form angles within the range of 60±2° with the axis of rotation, the maximum radii of these frustoconical parts being such that the dimension $[R_f+(H+H)]-R_J$ is less than the maximum radial dimension of the annular reinforcement element cross section, the angle $\alpha$ being the angle formed by the generatrix of the frustoconical portion axially to the outside of the cylindrical portion of the ring inner face, $R_F$ being the radius of the rim base cylindrical part and $R_J$ the maximum radius of the rim base frustoconical part.

2. A rim according to claim 1, in which the cross section of the annular reinforcement element includes faces parallel to the contour of the flange of the radially outer face of the side ring and to its radially inner face at the level of the junction between the cylindrical portion and the generatrix of the axially outer frustoconical portion.

3. A rim according to claim 1, in which the cross section of the annular reinforcement element is circular.

4. A rim according to claim 1, in which the annular reinforcement element is an annular coil spring with adjoining metal turns, the cross-section of the turn being circular and the diameter being between 2 and 4 mm.

5. A rim according to claim 4, in which there is inserted within the coil spring a ring of vulcanized material with a secant modulus of elasticity, with relative elongation of 10%, at least equal to 5.5 Mpa, which ring is circularly discontinuous.

6. A rim according to claim 4, in which there is inserted within the coil spring a ring of plastic material, which ring is circularly discontinuous.

7. A rim according to claim 1, in which the cylindrical portion of the radially inner face of each side ring is provided with a protrusion of triangular shape, which protrusion corresponds to a recess on the cylindrical part of the rim base.

8. A rim according to claim 1, in which each side ring has a radially outer face the profile of which satisfies existing standards for rim profiles.

9. A rim according to claim 1, in which the side ring is made of vulcanized material which has a secant modulus of elasticity with 10% relatively elongation which is equal to at least 5.5 MPa.

10. A rim according to claim 1, in which the side ring is reinforced by a reinforcement armature of radial cables, which armature is turned around the annular reinforcement element to form distinct layers in the seat of the ring.

11. An assembly of a rim and a tire of "heavy truck" type and form ratio less than 0.80, said rim comprising a rim base and two side rings removably mounted on the rim base at axially opposite ends thereof
    each side ring including a tire seat and a flange, the seat, viewed in meridian section, having a radially outer face formed of a frustoconical generatrix forming with the axis of rotation of the rim an angle of between 0° and 15° which outer face is connected with the outer face of the flange by a circular arc,
    each side ring having a radially inner face which includes an axially inner cylindrical portion of axial width between $L+H(H+h)/2$ and $L+(H+h)$ and an axially outer frustoconical portion the generatrix of which forms an angle of between 10° and 35° with the axis of rotation, L being the axial width of the frustoconical seat, H being the height of the flange from the radius $R_S$ measured from the axis of rotation of the rim to the largest circumference of the frustoconical seat and h being the thickness of the seat equal to Rs-Re, Re being the radius of the cylindrical portion of the inner face of the side ring,
    each side ring being formed of a material between the radially outer face of the flange and the radially inner face of the ring which material is reinforced by an annular reinforcement element, the circumferential length of which is extendable by at least 3% and having a cross section the maximum radial dimension of which is between (H+h) and H, the deformation of the section under compression stress being less than 2% and
    said rim base having a cylindrical part of radius equal to kRe, k being between 1.02 and 1.05, this cylindrical part extending axially to the outside by frustoconical parts, the generatrices of which from angles within the range of $\alpha \pm 2°$ with the axis of rotation, the maximum radii of these frustoconical parts being such that the dimension $[R_f+(H+h)]-R_J$ is less than the maximum radial dimension of the annular reinforcement element cross section, the angle $\alpha$ being the angle formed by the generatrix of the frustoconical portion axially to the outside of the cylindrical portion of the ring inner face, $R_F$ being the radius of the rim base cylindrical part and $R_J$ the maximum radius of the rim base frustoconical part, and said tire having beads and a carcass reinforcement, at least two circumferentially unstretchable annular elements having spaced apart faces in the beads, the carcass having ends which are clamped between the two faces, said faces being flat and parallel to each other over an axial distance at least equal to 15 mm and inclined with respect to the axis of rotation by an angle, open towards the outside of the tire, of between 5° and 30°, one of the elements extending radially above portions of the ring flange and seat, the minimum radius $R_p$ of the annular elements closest radially to the axis of rotation being at least equal to the maximum radius $R_j$ of the rim on which the tire is mounted.

12. An assembly according to claim 11, in which at least one of the annular elements is metallic.

13. An assembly according to claim 12, in which at least one of the metallic elements is a bead wire formed by steel wires of rectangular section.

14. An assembly according to claim 12, in which at least one of the metallic elements is a bead wire formed of a rolled strip or ribbon of steel.

15. An assembly according to claim 12, in which at least one of the metallic elements is a metal ferrule of brass-coated steel.

16. An assembly according to either of claims 13 and 14, in which the carcass reinforcement of the tire has a turn-up portion clamped between the faces of two annular elements.

17. An assembly according to either of claims 13 and 14, in which the carcass reinforcement of the tire has an end clamped between the faces of two annular elements.

18. An assembly according to claim 12, in which the tire bead contains radially inner and outer ferrules of brass-plated steel and a bead wire and the carcass reinforcement has a turn-up portion obtained by winding around the bead wire and a portion clamped between the faces of the two metal ferrules, the radially inner face of the lower ferrule having a meridian profile conforming to the meridian profile of the radially outer face of the side ring to provide support for the lower ferrule.

19. An assembly according to claim 12, in which the tire bead contains radially inner and outer ferrules of brass-plated steel, a bead wire and a reinforcement armature of wires or cables wound around the bead wire to form two layers and in which the end of the carcass reinforcement is interposed between and reinforced radially on both sides by the two layers which, in turn, are clamped between two faces of the metal ferrules, the radially inner face of the inner ferrule having a meridian profile conforming to the meridian profile of the radially outer face of the side ring to provide support for the lower ferrule.

20. An assembly according to claim 19, in which the reinforcement armature is formed of wires or cables of aromatic polyamide inclined by an angle of between 60° and 90° with respect to the circumferential direction.

21. An assembly according to any of claims 18–20 in which both inner and outer ferrules have inner depending ends in proximity to the side ring so that the side ring provides support for both depending ends.

* * * * *

UNITED STATES PATENT AND TRADEMARK OFFICE
CERTIFICATE OF CORRECTION

PATENT NO. : 5,232,033
DATED      : Aug. 3, 1993
INVENTOR(S) : Durif

It is certified that error appears in the above-identified patent and that said Letters Patent is hereby corrected as shown below:

On title page, Item [56]: Foreign Patent, "6/1976" should read --5/1976--; 2nd col., delete the 5th line. Col. 1, line 68, " radius $\sigma_1$ " should read -- radius $\rho_1$ --. Col. 4, line 39, "apart" should read --a part--; line 54, "at least one" should read --at least on--; line 56, "nd" should read --and--. Col. 5, line 15, "ring," should read --ring and,--; line 58, "show" should read --show, again in--. Col. 6, line 64, "the, turns-- should read --the turns--. Col. 7, line 34, "live bead" should read --tire bead--; line 47, "namely" should read --namely 36--; line 53, "distance e" should read --distance $\varepsilon$--. Col. 8, line 2, "$R_1$" should read -- $R_J$--; line 24, "distance e" should read --distance $\varepsilon$--; line 25, "84" should read --84'--; line 52, "and" should read --end--. Col. 9, line 49, "60" should read -- $\alpha$ --; line 52, "$R_f$" should read --$R_F$--. Col. 10, line 23, "relatively" should read --relative--; line 43, "L + H(H+h)/2" should read --L + (H + h)/2--; line 65, "from" should read --form--. Col. 11, line 1, "$R_f$" should read --$R_F$--.

Signed and Sealed this

Sixteenth Day of August, 1994

BRUCE LEHMAN

Attest:

Attesting Officer    Commissioner of Patents and Trademarks